3,272,695
VINYL-SULPHONIC ACID ESTER FUNGICIDES
Paul-Ernst Frohberger, Burscheid, Hanshelmut Schlör, Wuppertal-Barmen, and Rudolf Kress and Rudolf Heiss, Cologne-Stammheim, Germany, assignors to Farbenfabriken Bayer Aktiengesellschaft, Leverkusen, Germany, a corporation of Germany
No Drawing. Filed Feb. 25, 1964, Ser. No. 347,129
Claims priority, application Germany, Mar. 12, 1963, F 39,226
6 Claims. (Cl. 167—30)

The present invention is concerned with the use of known vinyl-sulphonic acid esters as fungicides.

It is already known that vinyl-sulphonic acid esters can be used as monomers for polymerisation, but nothing has been known so far with regard to the biological properties of these compounds.

It is an object of the present invention to provide fungicidal active substances. Another object consists in that these fungicidal substances are obtainable by a technically simple process. Further objects can be seen from the following description and from the examples.

It has been found that vinyl-sulphonic acid esters of the formula

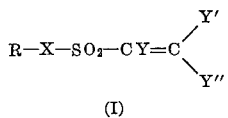

(I)

wherein

R stands for a possibly substituted aliphatic radical or a possibly substituted aromatic radical
X stands for oxygen or sulphur, and
Y, Y' and Y" stand for hydrogen or halogen and possess strong fungicidal properties.

It must be considered definitely surprising that vinyl-sulphonic acid esters have a fungicidal activity, since they have been known for some time and have frequently been the subject of detailed investigations, without anything being disclosed with regard to their biological properties. Neither are chemically similar compounds known to have fungicidal properties. The vinyl-sulphonic acid esters to be used according to the invention are a valuable addition to fungicidal agents.

The vinyl-sulphonic acid esters are clearly characterised by the above Formula I. In this formula, R preferably stands for alkyl with 1-4 carbon atoms and aryl with up to 10 carbon atoms. These radicals are preferably substituted by halogen, nitro, alkyl with 1-6 carbon atoms, alkoxy with 1-4 carbon atoms, the amino group, and alkylamino groups with 1-4 carbon atoms in the alkyl radicals, alkylmercapto with 1-4 carbon atoms, alkenyl with 2-6 carbon atoms and the

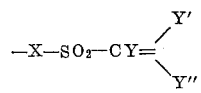

group. X stands for oxygen and sulphur, while Y, Y' and Y" preferably stand for hydrogen, chlorine and bromine.

Specific examples of vinyl-sulphonic acid esters to be used according to the invention are:

Vinyl-sulphonic acid-m-chloro-phenyl ester, vinyl-sulphonic acid-m-methyl-p-chloro-phenyl ester, vinyl-sulphonic acid-methyl ester, vinyl-sulphonic acid-thiophenyl ester, 1-chlorovinyl-sulphonic acid-p-chloro-phenyl ester, 1,2-dichloro-vinyl-sulphonic acid phenyl ester and vinyl-sulphonic acid-naphthyl ester. A number of further compounds are mentioned in the examples.

The sulphonic acid esters to be used according to the invention are known, and improved processes for their production have recently been developed (cf. e.g. German published specifications Nos. 1,091,104; 1,094,735 and 1,119,253.

The vinyl-sulphonic acid esters exhibit strong fungicidal properties, have a broad spectrum of activity, are readily tolerated by plants and only slightly toxic. For these reasons, they are very well suited as plant protectives for combating undesirable fungus growth. Their practical application as plant protectives is not impaired by odour or an irritating effect.

The vinyl-sulphonic acid esters are especially suitable for combating phytopathogenic soil fungi, as seed dressings and as agents against fungi of leaves or sprouts. Representative examples of fungi which can be controlled are mentioned in the examples.

The substances according to the invention can be applied as such or in the form of customary compositions, such as emulsifiable concentrates, spray powders, pastes, soluble powders, dusts and granulates. These are prepared in known manner (cf. e.g. Agricultural Chemicals, March 1960, pages 35-38). Suitable auxiliaries are mainly: solvents such as aromatics (e.g. xylene, benzene), chlorinated aromatics (e.g. chlorobenzenes), paraffins (e.g. petroleum fractions), alcohols (e.g. methanol, butanol), amines (e.g. ethanolamine, dimethyl formamide), and water; carrier substances, such as natural rock flours (e.g. kaolins, aluminas, talc and chalk), and synthetic stone powders (e.g. highly dispersed silicic acids and silicates); emulsifiers, such as non-ionic and anionic emulsifiers (e.g. polyoxyethylene-fatty acid esters, polyoxyethylene-fatty alcohol ethers, alkyl-sulphonates and aryl-sulphonates); and dispersing agents, such as lignin, sulphite waste liquors and methyl cellulose.

The active substances according to the invention can be present in the formulations in mixture with other known active substances, such as fungicides, bactericides, insecticides, nematicides, herbicides, but also fertilizers and agents for improving the structure of the soil.

The vinyl-sulphonic acid esters or their formulations are applied in the manner customary for the individual indications.

The following examples are given for the purpose of illustrating the invention.

EXAMPLE 1.—ACTIVITY AGAINST PHYTO-PATHOGENIC SOIL FUNGI

In order to determine the range of activity, the inhibiting effect of the active substances according to the invention on the mycelium growth of various phytopathogenic fungi was tested on an artificial substrate. For this purpose, the active substances were dissolved in acetone (1%) and the solutions added to potato-dextrose-agar which was liquefied by heating, so that a concentration of active substance of 100 mg. per litre was attained therein. When the mixture of active substance and substrate had solidified at room temperature, the microscopic fungi were applied by inoculation from pure cultures in the form of small discs of 5 mm. diameter. After incubation at 20° C. for 3 days, the mycelium growth or the inhibiting effect for the preparations in comparison with the untreated substrate was determined. The following phytopathogenic fungi were used:

*Sclerotium rolfsii*
*Sclerotinia sclerotiorum*
*Verticillium alboatrum*
*Thielaviopsis basicola*
*Phytophthora cactorum*
*Fusarium culmorum*
*Fusarium oxysporum*
*Fusarium solani* f. *pisi*

The compounds to be seen in the following Table I (1)–(30) were used as active substances. It was found that at a concentration of 100 p.p.m. in the substrate, these compounds completely inhibited the mycelium growth of all the test fungi. A universal fungistatic power of the compounds thus exists.

Table I

| No. | Active substance |
|---|---|
| (1) | $\langle C_6H_5 \rangle-O-SO_2-CH=CH_2$ |
| (2) | $Cl-\langle C_6H_4 \rangle-O-SO_2-CH=CH_2$ (para) |
| (3) | $\langle C_6H_4 \rangle-O-SO_2-CH=CH_2$ with Cl (ortho) |
| (4) | $\langle C_6H_4 \rangle-O-SO_2-CH=CH_2$ with Cl (meta) |
| (5) | $Cl-\langle C_6H_3 \rangle-O-SO_2-CH=CH_2$ with Cl |
| (6) | $\langle C_6H_4 \rangle-O-SO_2-CH=CH_2$ with Br |
| (7) | $\langle C_6H_4 \rangle-O-SO_2-CH=CH_2$ with $NO_2$ |
| (8) | $\langle C_6H_4 \rangle-O-SO_2-CH=CH_2$ with $CH_3$ |
| (9) | $\langle C_6H_4 \rangle-O-SO_2-CH=CH_2$ with $OCH_3$ |
| (10) | $(CH_3)_3C-\langle C_6H_4 \rangle-O-SO_2-CH=CH_2$ |
| (11) | $Cl-\langle C_6H_3 \rangle-O-SO_2-CH=CH_2$ with $CH_3$ |
| (12) | $Cl-\langle C_6H_2 \rangle-O-SO_2-CH=CH_2$ with two $CH_3$ |
| (13) | $\langle C_6H_4 \rangle-O-SO_2-CH=CH_2$ with $CH_3$ |
| (14) | $CH_3O-\langle C_6H_4 \rangle-O-SO_2-CH=CH_2$ |
| (15) | $(CH_3)_2N-\langle C_6H_3 \rangle-O-SO_2-CH=CH_2$ with $CH_3$ |
| (16) | $C_2H_5O-\langle C_6H_4 \rangle-O-SO_2-CH=CH_2$ |
| (17) | $CH_3-\langle C_6H_4 \rangle-O-SO_2-CH=CH_2$ |
| (18) | $CH_3S-\langle C_6H_2 \rangle-O-SO_2-CH=CH_2$ with two $CH_3$ |
| (19) | $CH_3S-\langle C_6H_3 \rangle-O-SO_2-CH=CH_2$ with $CH_3$ |
| (20) | $\langle C_6H_4 \rangle-O-SO_2-CH=CH_2$ with $CH(CH_3)_2$ |
| (21) | $\langle C_6H_4 \rangle-O-SO_2-CH=CH_2$ with $CH-CH_3$, $CH=CH_2$ |
| (22) | $CH_2=CH-SO_2-O-\langle C_6H_4 \rangle-O-SO_2-CH=CH_2$ |
| (23) | $\langle C_6H_3 \rangle-O-SO_2-CH=CH_2$ with two $C_2H_5$ |
| (24) | $\langle C_6H_4 \rangle-O-SO_2-CH=CH_2$ with $O-CH(CH_3)_2$ |
| (25) | $\langle C_6H_4 \rangle-O-SO_2-CH=CH_2$ with $NO_2$ |
| (26) | $O_2N-\langle C_6H_4 \rangle-O-SO_2-CH=CH_2$ |
| (27) | $CH_3S-\langle C_6H_3 \rangle-O-SO_2-CH=CH_2$ with $O_2N$ |
| (28) | $O_2N-\langle C_6H_3 \rangle-O-SO_2-CH=CH_2$ with $CH_3$ |
| (29) | $O_2N-\langle C_6H_3 \rangle-O-SO_2-CH=CH_2$ with $O_2N$ |
| (30) | $\langle C_6H_5 \rangle-O-SO_2-CCl=CH_2$ |

EXAMPLE 2.—APPLICATION AS AGENTS FOR SOIL TREATMENT

The active substances were extended with talc to a 5%, and then with sand to a 0.5% content of active substance, and carefully mixed with the soil which subsequently served as cultivation medium for various plants. Normal compost was used as soil which was naturally infected with various kinds of phytopathogenic fungi. After sowing canning peas into this soil, the young pea seedlings were soon attacked by *Pythium ultimum*, whereby they exhibited more or less extended rotten areas, their growth was retarded, or they were completely destroyed by Pythium rot. Furthermore, Fruhstorfer standard soil was sterilised by heat and subsequently artificially inoculated by admixing pure cultures of one type of phytopathogenic fungus each time. Here, too, peas were used as host plants for *Rhizoctonia solani, Fusarium*

*culmorum* and *Verticillium alboatrium*. In order to test the agents against *Thielaviopsis basicola*, cotton seeds were used analogously. Three weeks after sowing five times 10 seeds, the number of healthy plants was ascertained as a criterion of the protective effect of the soil fungicide, and expressed in percent of the seeds used. The results obtained are assembled in the following Table II.

*triticina*) and subsequently sprayed with a 0.1% aqueous solution of vinyl-sulphonic acid-m-chloro-phenyl ester (Table I [3]) or, for comparison, with pure water in such a manner that the whole leaf blade was covered with fine spray droplets without the spray liquor dripping off. Optimum conditions of infection were created with 98% atmospheric humidity at 20° C. Ten days after contamination and treatment, a thick layer of rust spots had

*Table II*

| Active substance | Concentration of active substance in the soil, mg./litre | Number of healthy plants 3 weeks after sowing ||||| 
|---|---|---|---|---|---|---|
| | | *Rhizoc. sol.* on peas | *Fusarium culm.* on peas | In percent *Phyt. ult.* on peas | *Vert. alb.* on peas | *Thiel. bas.* on cotton |
| Sterilised soil untreated | | 95 | 100 | | 90 | 86 |
| Contaminated soil untreated | | 0 | 30 | 4 | 0 | 0 |
| (1) 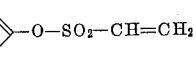 | 100 | 70 | 70 | 90 | | |
| (2) 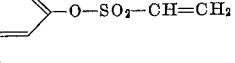 | 100 | 64 | 36 | 76 | 96 | 76 |
| (3)  | 100 | 92 | 56 | 82 | 92 | 80 |
| (4) 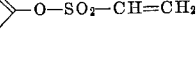 | 100 | 60 | 60 | | | |
| (5) 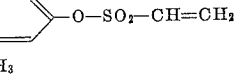 | 100 | 60 | 65 | 94 | | |

EXAMPLE 3.—APPLICATION AS SEED DRESSING

The active substances were ground in a mortar with talc in the specified concentration to a fine-grain, homogeneous powder, and applied as dry dressing in the usual manner to 2 g./kg. of wheat, barley and rye, 3 g./kg. of oats, and 6 g./kg. of sugar beet.

For testing smut of wheat (*Tilletia tritici*), wheat seeds were used which had previously been contaminated with 5 g. of spores per kilogram. The seeds were subsequently dressed dry with the aforesaid amount. The wheat grains thus treated were placed on moist loam, covered with a layer of muslin on which a 2 cm. layer of compost was placed. The wheat grains were subsequently kept at a temperature of 10° C. for 10 days. Finally, the muslin layer was removed and the grains were microscopically examined for spore germination. The vinyl-sulphonic acid ester completely inhibited spore germination at a concentration of 10% in the seed dressing agent.

Tests with loose smut on oats (*Ustilago avenae*), stripe disease on barley (*Helminthosporium gramineum*) and damping off on beets (*Phoma betae*) were carried out in greenhouse vegatation experiments with naturally highly infected seeds whereby a high percentage of diseased plants developed, showing the typical symptoms. By using vinyl-sulphonic acid-m-chlorophenyl ester (Table I [3]) as a 30% dry dressing, complete success in combating the stripe disease of barley could be achieved. The same effect was achieved already by a 3% dry dressing against loose smut on oats.

After treating Phoma-infested sugar beet seeds with a dry dressing which contained 15% of vinyl-sulphonic acid-p-chlorophenyl ester (Table I [2]) as active substance, an average of 89.5 healthy beet plants could be attained from 100 beet seeds, whereas the untreated seeds produced only 31 healthy plants from 100 seeds.

EXAMPLE 4.—APPLICATION AS LEAF- AND SPROUT-FUNGICIDE

The first leaf of young wheat plants was contaminated with an Uredo spore suspension of brown rust (*Puccinia* formed on the untreated wheat plants, whereas the treatment with the preparation had prevented any formation of rust spots.

We claim:

1. A method for combating fungi which comprises applying to said fungi an effective amount of a vinyl-sulphonic acid ester of the formula

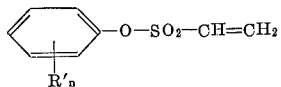

wherein
R' is a member selected from the group consisting of halo, nitro, alkyl of 1–6 carbon atoms, alkoxy of 1–4 carbon atoms, amino, alkyl amino of 1–4 carbon atoms in the alkyl radical, alkyl mercapto of 1–4 carbon atoms, alkenyl of 2–6 carbon atoms and the —O—SO$_2$—CH=CH$_2$ group; and
n is a whole number of 0–3.

2. A method for combating fungi which comprises applying to said fungi an effective amount of a vinyl-sulphonic acid ester of the formula

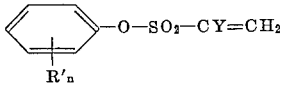

wherein
R' is a member selected from the group consisting of halo, nitro, alkyl of 1–6 carbon atoms, alkoxy of 1–4 carbon atoms in the alkyl radical, amino, alkyl amino of 1–4 carbon atoms in the alkyl radical, alkylmercapto of 1–4 carbon atoms, alkenyl of 2–6 carbon atoms, and —O—SO$_2$—CY=CH$_2$ group;
n is a whole number of 0–3; and
Y is halogen.

3. A method for controlling fungi which comprises applying to said fungi an effective amount of a vinyl-sulphonic acid ester of the formula

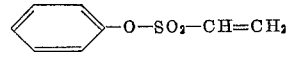

4. A method for controlling fungi which comprises applying to said fungi an effective amount of a vinyl-sulphonic acid ester of the formula

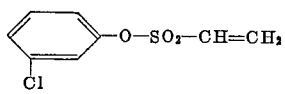

5. A method for controlling fungi which comprises applying to said fungi an effective amount of a vinyl-sulphonic acid ester of the formula

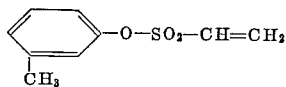

6. A method for controlling fungi which comprises applying to said fungi an effective amount of a vinyl-sulphonic acid ester of the formula

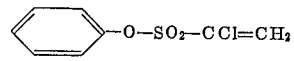

References Cited by the Examiner

UNITED STATES PATENTS 2,695,308  11/1954  Gilbert _____ 167—22

OTHER REFERENCES

Chemical Abstracts 61: p. 14586f (1964).
Chemical Abstracts 62: p. 8335c (1965).

JULIAN S. LEVITT, *Primary Examiner.*
JEROME D. GOLDBERG, *Assistant Examiner.*